US009346210B2

(12) United States Patent
Robbins

(10) Patent No.: US 9,346,210 B2
(45) Date of Patent: May 24, 2016

(54) EXTRUSION DIE PRE-HEATING SYSTEM, APPARATUS AND METHOD

(71) Applicant: Exco Technologies Limited, Markham (CA)

(72) Inventor: Paul Henry Robbins, Port Perry (CA)

(73) Assignee: EXCO TECHNOLOGIES LIMITED

( * ) Notice: Subject to any disclaimer, the term of this patent is extended or adjusted under 35 U.S.C. 154(b) by 468 days.

(21) Appl. No.: 13/692,582

(22) Filed: Dec. 3, 2012

(65) Prior Publication Data
US 2013/0187303 A1 Jul. 25, 2013

Related U.S. Application Data

(60) Provisional application No. 61/566,515, filed on Dec. 2, 2011.

(51) Int. Cl.
| | |
|---|---|
| *B21C 23/21* | (2006.01) |
| *B29C 47/80* | (2006.01) |
| *B21C 29/04* | (2006.01) |
| *B25J 9/02* | (2006.01) |
| *F27D 19/00* | (2006.01) |
| *F27D 3/00* | (2006.01) |

(52) U.S. Cl.
CPC ............. *B29C 47/802* (2013.01); *B21C 23/214* (2013.01); *B21C 29/04* (2013.01); *B25J 9/026* (2013.01); *F27D 19/00* (2013.01); *F27D 2003/008* (2013.01)

(58) Field of Classification Search
CPC .. B29C 47/802; B29C 47/0818; B29C 33/30; B21C 23/214; B21C 29/04; B21C 23/212; B25J 9/026

USPC .................. 414/155, 179; 221/150 R
See application file for complete search history.

(56) References Cited

U.S. PATENT DOCUMENTS

| | | | | |
|---|---|---|---|---|
| 3,543,557 | A | * | 12/1970 | Lomas ............................ 72/263 |
| 3,566,659 | A | * | 3/1971 | Cameron ........................ 72/263 |
| 4,518,338 | A | | 5/1985 | Hehl |
| 4,895,507 | A | * | 1/1990 | Yano .......................... 425/192 R |
| 5,445,282 | A | * | 8/1995 | Erikkila ........................ 212/312 |
| 6,884,969 | B1 | | 4/2005 | Brach et al. |
| 6,893,600 | B2 | | 5/2005 | Hughes et al. |
| 7,238,309 | B2 | * | 7/2007 | Adriaansen et al. ......... 264/40.1 |
| 7,393,205 | B2 | | 7/2008 | Schwartz |
| 8,042,425 | B2 | * | 10/2011 | Dujardin .................... 74/490.09 |
| 8,956,568 | B2 | * | 2/2015 | Ohiso et al. ..................... 422/63 |

(Continued)

FOREIGN PATENT DOCUMENTS

| | | |
|---|---|---|
| EP | 0274366 A1 | 7/1988 |
| EP | 0529198 | 3/1993 |

(Continued)

*Primary Examiner* — Kaitlin Joerger
(74) *Attorney, Agent, or Firm* — Young Basile Hanlon & MacFarlane, P.C.; Denise M. Glassmeyer

(57) ABSTRACT

A die pre-heating system comprises at least one die oven, a robotic hoist and processing structure in communication with the hoist and the at least one die oven. The processing structure is configured to control the hoist to permit an extrusion die to be loaded into the at least one die oven and to be unloaded from the at least one die oven. The processing structure is also configured to cause the at least one die oven to operate according to a production formula for pre-heating an extrusion die loaded therein.

12 Claims, 9 Drawing Sheets

(56) References Cited

U.S. PATENT DOCUMENTS

| | | |
|---|---|---|
| 8,973,768 B1 * | 3/2015 | Jung et al. ............... 212/312 |
| 2002/0045172 A1 * | 4/2002 | Sturm et al. ............... 435/6 |
| 2004/0099995 A1 | 5/2004 | Hughes et al. |
| 2005/0072549 A1 * | 4/2005 | Crafton et al. ............ 164/122 |
| 2008/0236779 A1 * | 10/2008 | Crafton et al. ........... 164/76.1 |
| 2014/0027941 A1 * | 1/2014 | Robbins .................. 264/39 |

FOREIGN PATENT DOCUMENTS

| | | | |
|---|---|---|---|
| EP | 05829198 A2 | 3/1993 | |
| GB | 1315314 A * | 5/1973 | ............ B21C 23/212 |
| JP | 2007313546 | 12/2007 | |
| KR | 100840388 | 6/2008 | |

* cited by examiner

EXTRUSION DIE PRE-HEATING SYSTEM, APPARATUS AND METHOD

CROSS-REFERENCE TO RELATED APPLICATION

This application claims the benefit of U.S. Provisional Application No. 61/566,515 to Robbins filed on Dec. 2, 2011 and entitled "EXTRUSION DIE PRE-HEATING SYSTEM AND METHOD", the entire disclosure of which is incorporated herein by reference.

FIELD OF THE INVENTION

The present invention relates generally to extrusion and in particular, to an extrusion die pre-heating system, apparatus and method.

BACKGROUND OF THE INVENTION

Extrusion involves the shaping of a work piece by forcing the work piece through an extrusion die using an extrusion press. During this process, the cross-sectional shape of the extruded work piece generally conforms to the shape of the extrusion die aperture. Metals and metal alloys can be extruded using either "hot extrusion" or "cold extrusion", depending on the temperature at which the extrusion is carried out. During hot extrusion, the work piece and the extrusion die are both maintained at an elevated temperature. For example, aluminum and aluminum alloys are typically hot extruded at temperatures ranging from about 350 degrees Celsius (° C.) to about 500° C.

During the hot extrusion process, extrusion dies are typically pre-heated to the desired extrusion temperature in a separate oven prior to being installed in the extrusion press. This pre-heating of the extrusion dies reduces the time needed to bring the extrusion press to operating conditions, thereby increasing the throughput of the extrusion press.

Equipment for pre-heating extrusion dies has been previously considered. For example, U.S. Pat. No. 7,393,205 to Schwartz discloses a device for heating up extrusion dies prior to their installation in an extruder, whereby the extrusion dies are heated up to a prescribed temperature and kept at this temperature. The device comprises a gas-tight and thermally insulated oven housing that has at least one charging and discharging opening with an oven cover and, inside the oven housing, there is an impact nozzle field into which an extrusion die can be placed. The device is provided with a heating means that heats up a fluid that flows through the openings of the impact nozzle field.

U.S. Pat. No. 6,884,969 to Brach et al. discloses an infrared die oven having a die cradle for holding a die. A thermocouple is positioned within the die cradle to maintain it in direct contact with the die. A controller connected to the thermocouple continually reads the temperature of the die. When the die reaches a threshold temperature, the intensity of an infrared heating element in the oven is reduced. When the die reaches the desired temperature, the controller continuously adjusts the heater intensity to maintain the die at the desired temperature.

European Patent Application No. 0529198 to Perdersoli discloses a controlled-atmosphere furnace for preheating dies for extruding aluminum and alloys thereof. The furnace includes a supporting frame which delimits, at a portion of a side wall, at least one chamber which can be closed tight with respect to the outside environment, a chamber door which can be opened outward and has a supporting frame for a part to be preheated, and resistors for heating the chamber.

Automated handling equipment for extrusion dies has also been previously considered. For example, European Patent Application No. 0274366 to Zurru et al. discloses a die exchange device for horizontal axis extruding presses. The device comprises a supporting column provided with guides extending therealong, a carriage movable along the guides and provided with two rest shelves, each for a respective die holding slide, drive means to take each shelf to a die exchange position close to an extrusion working position of the press, and pusher means for shifting a die holding slide from the die exchange position to the extrusion working position, and vice versa.

Automated handling and pre-heating systems for polymer injection molding dies have also been previously considered. For example, U.S. Pat. No. 6,893,600 to Hughes et al. discloses a die preparation and exchange method, wherein dies to be inserted into an injection molding machine are electrically and fluidly heated prior to insertion so as to prepare the dies to make parts more quickly.

U.S. Pat. No. 4,518,338 to Hehl discloses a device for program-controllable exchange of injection molding dies and for continuous preconditioning of an injection molding die, prior to and during its insertion into the die closing unit of an injection molding machine. The device comprises a translation table with two die emplacements which are alternatingly movable into transverse alignment with the die clamping space, for transfer of a die assembly by means of an endless roller chain with drive pins and a drive rack entraining the die assembly. Each die emplacement has a captive drive rack which carries a coupling head for flexible temperature conditioning supply lines, and each die assembly has a matching coupling head with coupling valves and an identification code incorporated in a multi-conductor connection, all connections being established by the mere lowering of the die assembly onto its die emplacement.

Although known systems and methods for extrusion die pre-heating may be adequate, improvements are generally desired. It is therefore an object of the present invention to provide a novel die pre-heating system, apparatus and method.

SUMMARY OF THE INVENTION

Accordingly, in one aspect there is provided a die pre-heating system comprising at least one die oven; a robotic hoist; and processing structure in communication with the hoist and said at least one die oven, the processing structure being configured to control the hoist to permit an extrusion die to be loaded into the at least one die oven and to be unloaded from the at least one die oven, the processing structure also being configured to cause the at least one die oven to operate according to a production formula for pre-heating an extrusion die loaded therein.

In one embodiment, the at least one die oven comprises a plurality of die ovens. Each die oven comprises a housing, a lid on the housing and an actuator in communication with the processing structure. The actuator is responsive to the processing structure to open and close the lid to permit the robotic hoist to place an extrusion die into the die oven or to remove an extrusion die from the die oven.

In one form, the robotic hoist is an overhead robotic hoist responsive to the processing structure and comprising a lifting mechanism positionable over each of the die ovens. Each extrusion die is supported on a die cradle and the lifting mechanism is configured to engage the die cradle. The lifting mechanism is moveable along three generally orthogonal axes. In one embodiment, the robotic hoist comprises at least one longitudinally extending first rail, a first trolley moveable along the first rail and supporting a second rail, the second rail being generally orthogonal to the first rail and a second trolley moveable along the second rail. The lifting mechanism is mounted on the second trolley and is moveable generally vertically.

In one embodiment, the extrusion die pre-heating system further comprises a scheduling zone accommodating die cradles supporting extrusion dies. The robotic hoist is responsive to the processing structure to remove a die cradle from the scheduling zone for delivery to a pre-heated die oven. The extrusion die pre-heating system also comprises a die cradle transport mechanism. The robotic hoist is responsive to the processing structure to remove a die cradle carrying a pre-heated extrusion die from a die oven for delivery to the die cradle transport mechanism.

In one embodiment, a production formula is assigned to each extrusion die to be pre-heated and wherein the production formula specifies a pre-heat temperature for a selected die oven prior to extrusion die placement therein. The production formula further specifies the duration the extrusion die is to spend in the selected pre-heated die oven.

According to another aspect, there is provided a method for pre-heating an extrusion die comprising inputting die identity information into processing structure, the processing structure being in communication with at least one die oven and with a robotic hoist; associating a production formula with the die identity information; directing, by the processing structure, said at least one die oven to pre-heat to a set temperature specified by the production formula; and directing, by the processing structure, the robotic hoist to load an extrusion die into the pre-heated at least one die oven for pre-heating the extrusion die.

In one embodiment, the method further comprises directing, by the processing structure, the robotic hoist to unload the extrusion die from the at least one die oven at a time specified by the production formula and optionally upon receipt of operator input.

According to yet another aspect there is provided a die pre-heating apparatus comprising a plurality of die ovens, each die oven being configured to pre-heat an extrusion die placed therein; and an overhead robotic hoist, said robotic hoist being configured to load and unload extrusion dies into and from said die ovens and to deliver pre-heated extrusion dies to an unloading zone.

BRIEF DESCRIPTION OF THE DRAWINGS

Embodiments will now be described more fully with reference to the accompanying drawings in which.

DETAILED DESCRIPTION OF THE EMBODIMENTS

Figure 1:
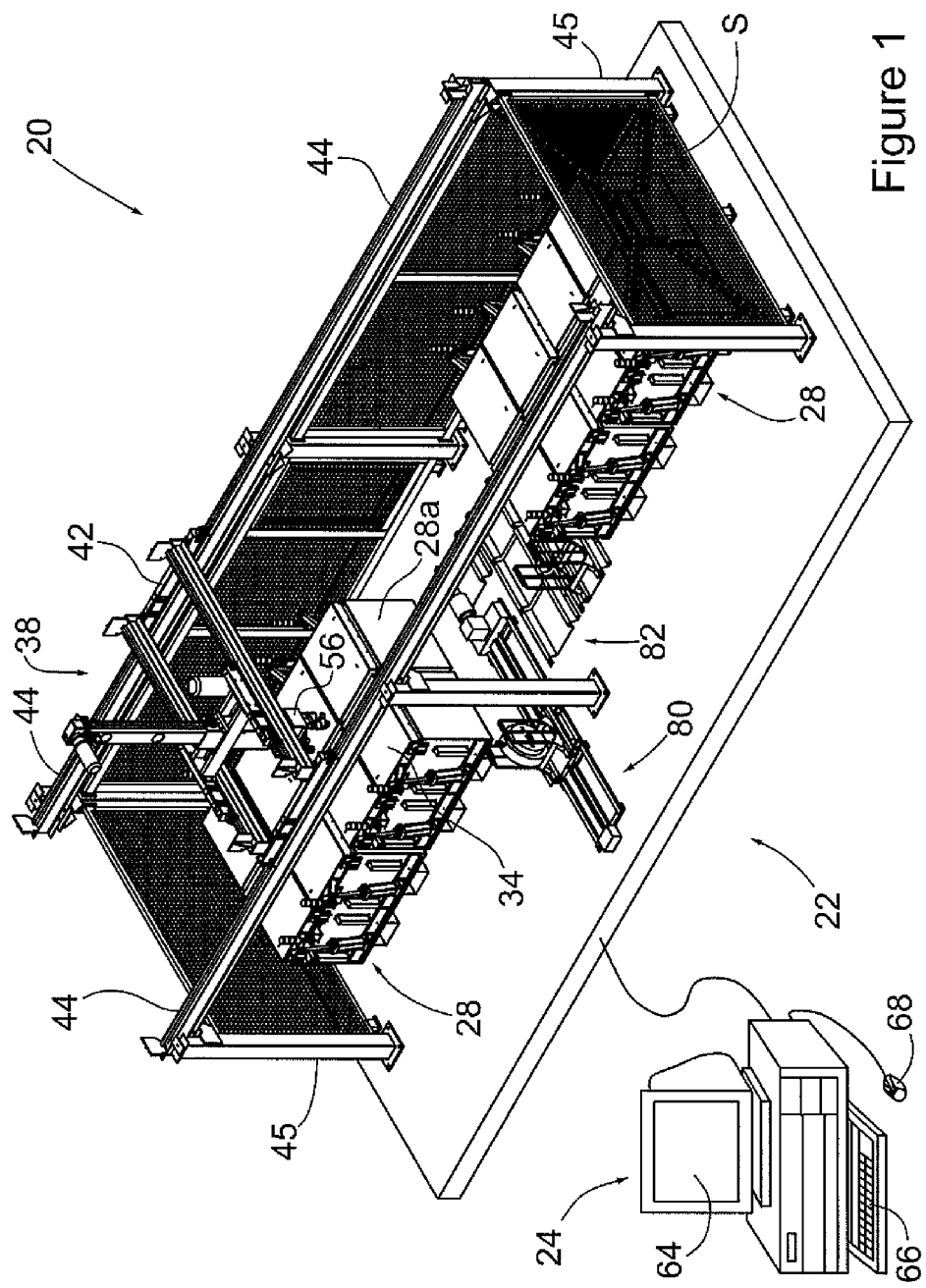
FIG. 1 is a partial schematic, perspective view of a die pre-heating system.
Figure 2:
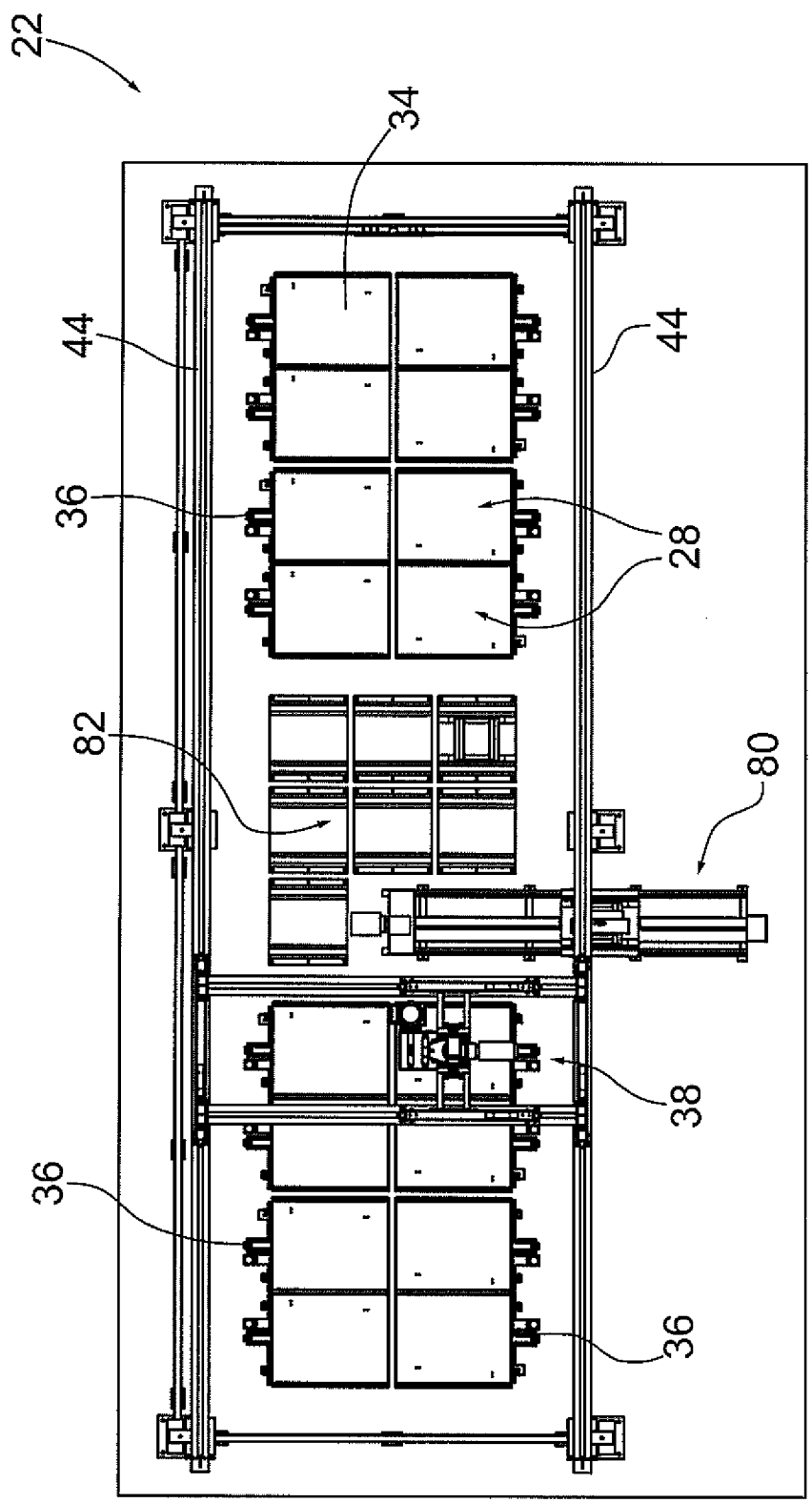
FIG. 2 is a top plan view of a die pre-heating apparatus forming part of the die pre-heating system of FIG. 1.
Figure 3:
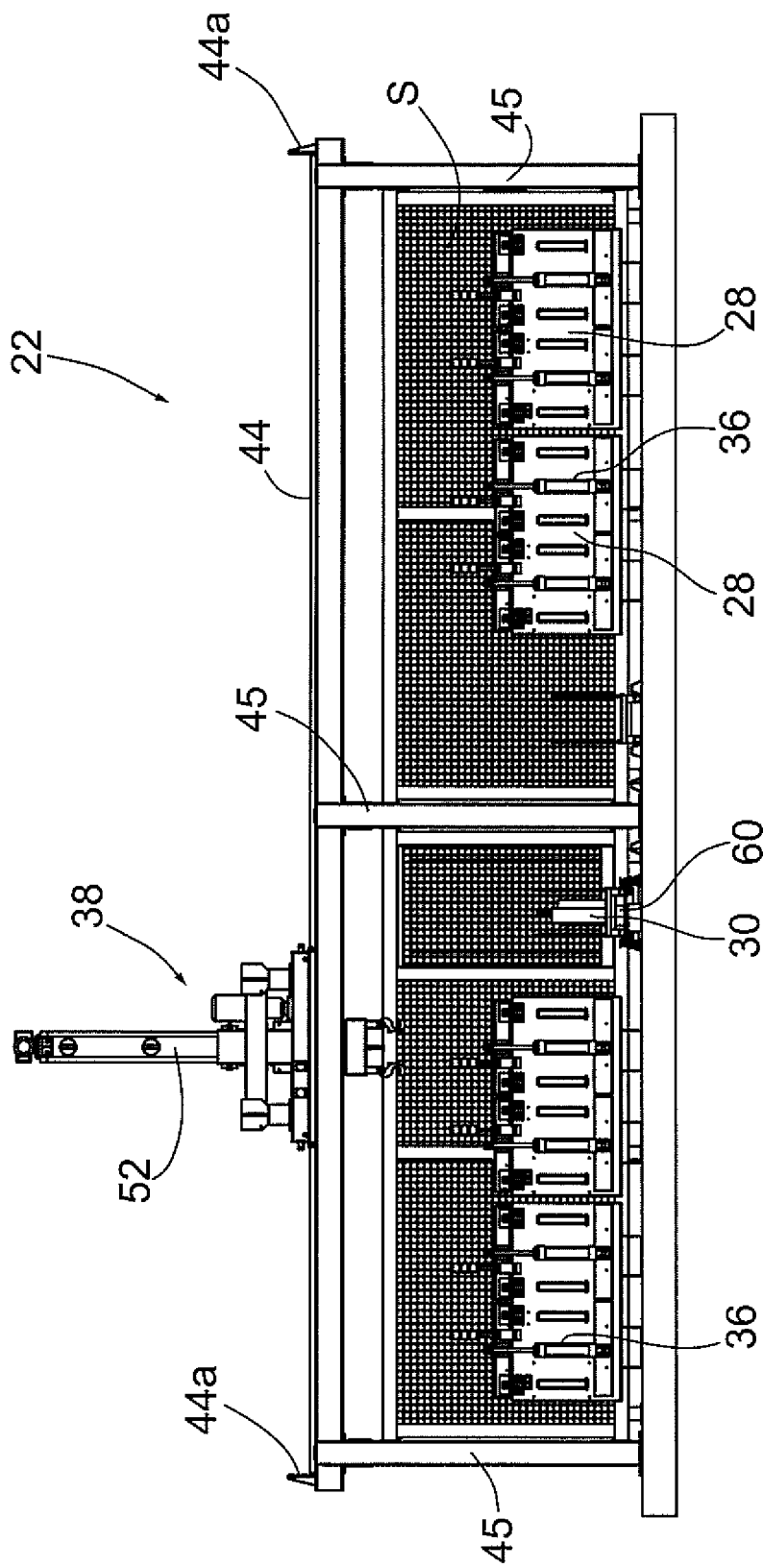
FIG. 3 is a front elevational view of the die pre-heating apparatus of FIG. 2.
Figure 4:
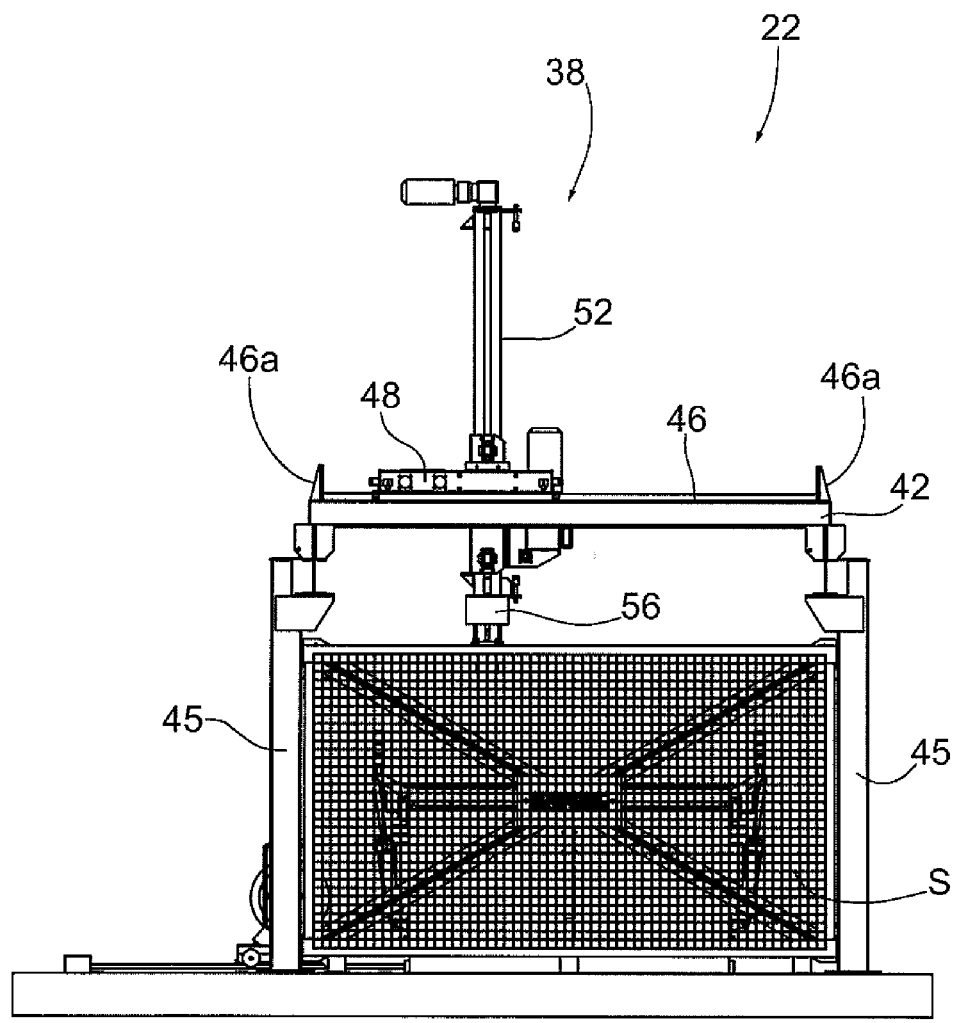
FIG. 4 is a side elevational view of the die pre-heating apparatus of FIG. 2.
Figure 5:
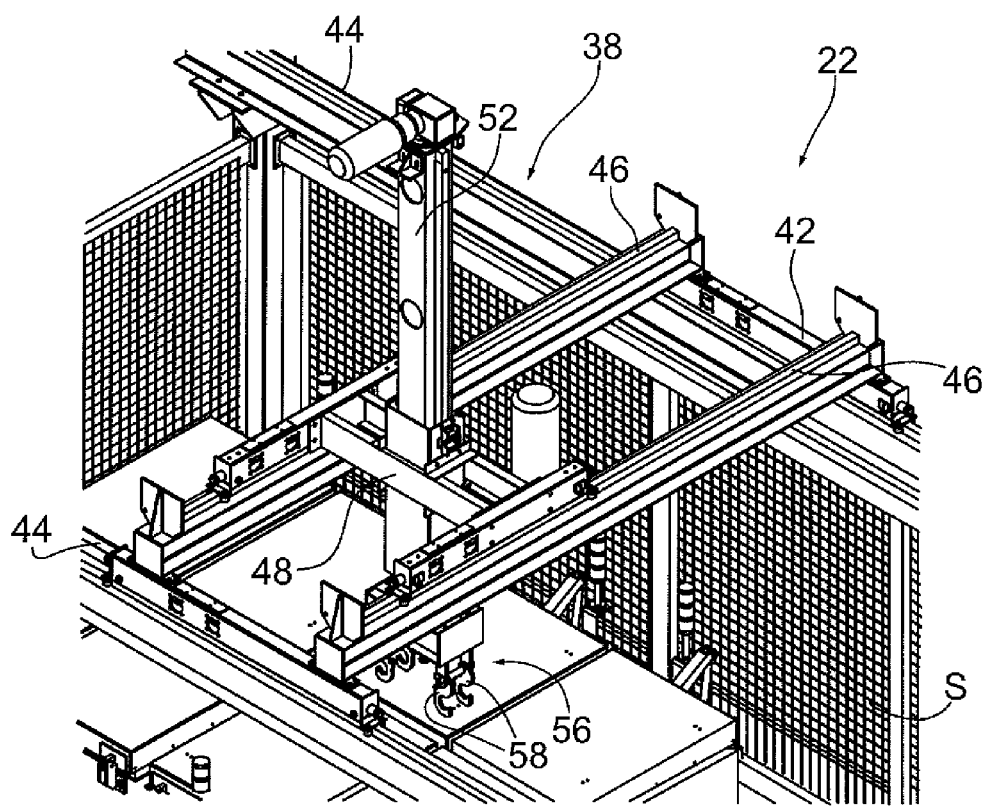
FIG. 5 is a perspective view of a robotic hoist forming part of the die pre-heating apparatus of FIG. 2.
Figure 6:
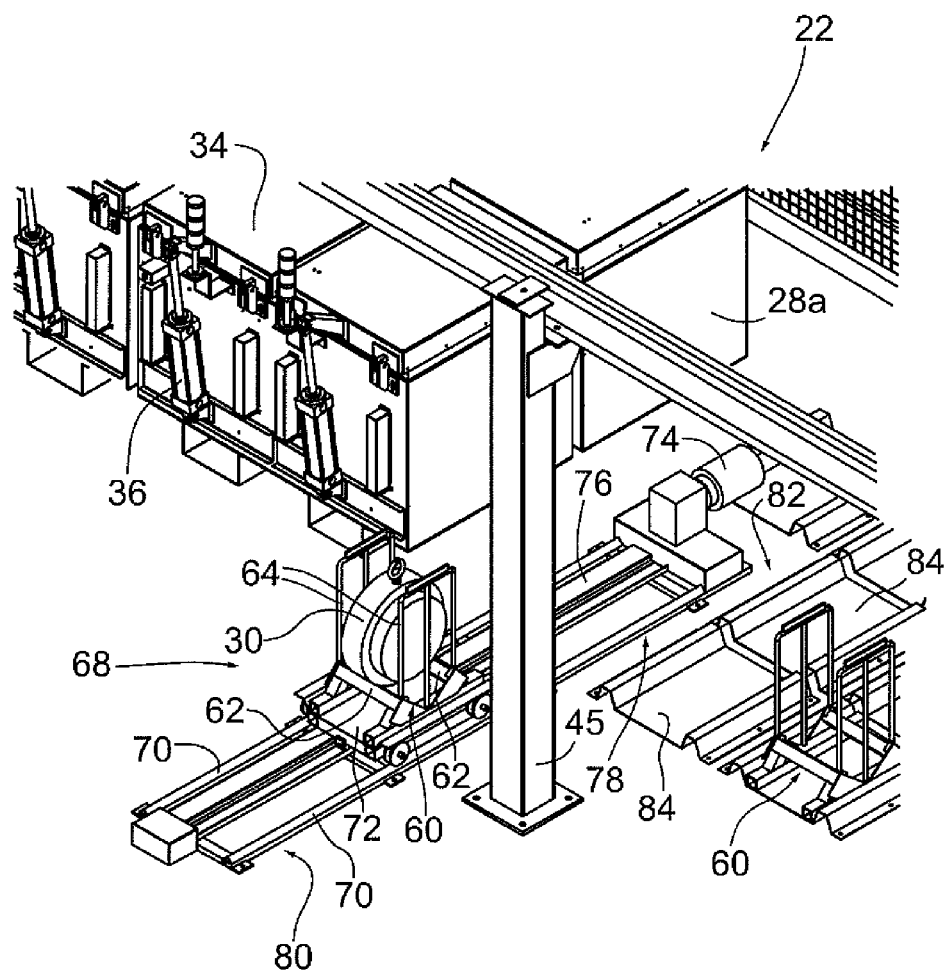
FIG. 6 is a perspective view of a portion of the die pre-heating apparatus of FIG. 2.
Figure 7:
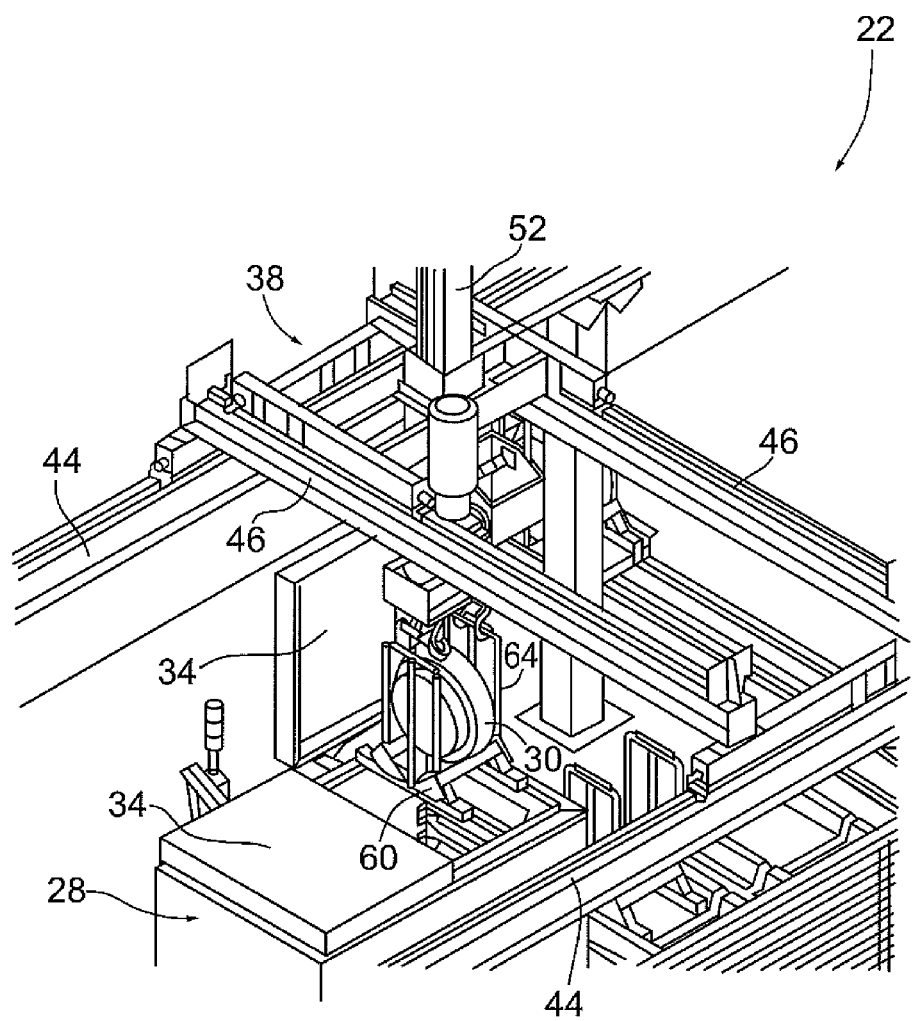
FIG. 7 is a rear perspective view of another portion of the die pre-heating apparatus of FIG. 2.

Turning now to FIGS. 1 to 7, an extrusion die pre-heating system for handling and heating extrusion dies is shown and is generally identified by reference numeral 20. Extrusion die pre-heating system 20 comprises a die pre-heating apparatus 22 that is in communication with a general purpose computing device 24. The general purpose computing device 24 is configured to control the die pre-heating apparatus 22 thereby to enable programmable and automated handling and heating of extrusion dies. The pre-heated extrusion dies may then be used in metal extrusion equipment (not shown), such as for example a metal extrusion press.

The die pre-heating apparatus 22 comprises a plurality of die ovens 28, each for accommodating and pre-heating an extrusion die 30. In the embodiment shown, die pre-heating apparatus 22 comprises sixteen (16) die ovens 28. The die ovens 28 are arranged into two laterally spaced groups of eight (8) die ovens 28. The die ovens 28 of each group are arranged in two rows. Each die oven 28 comprises a generally rectangular die oven housing 28a having an open top that is covered by an upper lid 34. The upper lid 34 of each die oven 28 is opened and closed during transfer of extrusion dies into and out the die oven 28 through operation of a hydraulic actuator 36 on the die oven housing 28a that acts on the upper lid 34. Each die oven 28 is in communication with the general purpose computing device 24 and operates according to a production formula, as will be described.

Each of the die ovens 28 is accessible by a robotic hoist 38 that is configured to transport extrusion dies 30 within the die pre-heating apparatus 22. In this embodiment, robotic hoist 38 comprises a pair of parallel, overhead gantry rails 44 extending generally the length of the die pre-heating apparatus that are supported by a plurality of upstanding posts 45. Stops 44a are provided at the ends of the gantry rails 44. A motorized trolley 42 is supported on the gantry rails 44 and is moveable therealong allowing the motorized trolley 42 to travel the length of the die pre-heating apparatus 22. The motorized trolley 42 supports a second pair of parallel gantry rails 46 that extend generally perpendicular to the gantry rails 44. Stops 46a are provided at the ends of the gantry rails 46. Another motorized trolley 48 is supported on the gantry rails 46 and is moveable therealong. The motorized trolley 48 supports a motorized lifting mechanism comprising a moveable shaft 52 that is configured to move vertically along an axis perpendicular to both the gantry rails 44 and the gantry rails 46. A motorized gripping device 56 is provided at the lower end of shaft 52. The gripping device 56 comprises two pairs of outwardly-oriented retractable hooks 58 shaped to engage a die cradle 60 that is configured to carry an extrusion die 30. The general purpose computing device 24 is configured to operate the robotic hoist 38 and its motorized components according to the production formula. In this embodiment, as the motorized trolleys 42 and 48 and shaft 52 are moveable along three orthogonal axes, the robotic hoist 38 is able to transport die cradles 60 in virtually any direction within the die pre-heating apparatus 22. A screen S surrounds three sides of the die pre-heating apparatus 22.

In the embodiment shown, each die cradle 60 comprises a base having two parallel base members 62, with feet at their opposite ends, on which an extrusion die 30 rests and a pair of laterally spaced, upstanding side rails 64 adjacent the ends of the base members 62, each of which bridges the base members 62. Each side rail 64 is shaped to be engaged by a respective pair of the retractable hooks 58 of the gripping device 56. As will be appreciated, the use of die cradles 60 allows the extrusion dies 30 to be carried within the die pre-heating apparatus 22 without being contacted directly by the robotic hoist 38, which advantageously reduces the possibility of damage to the extrusion die 30 during handling. Additionally, the use of die cradles 60 renders the die pre-heating apparatus 22 compatible with existing extrusion dies 30, and advantageously eliminates any need to modify extrusion dies 30 for handling by the die pre-heating apparatus 22.

A die cradle transport mechanism 68 is generally centrally positioned within the die pre-heating apparatus 22 between the two groups of die ovens 28 and comprises a pair of rails 70 that support a wheeled carriage 72 configured to carry a die cradle 60. The wheeled carriage 72 is driven along the rails 70 by a motor 74 and associated drive train 76 allowing the wheeled carriage 72 to move between loading and unloading zones 78 and 80 respectively positioned at opposite ends of the rails 70. A scheduling zone 82 is positioned beside the die cradle transport mechanism 68 adjacent the loading and unloading zone 78 and accommodates trays 84 on which die cradles 60 are placed.

The general purpose computing device 24 comprises suitable processing structure and hardware that are capable of process control and data acquisition. Thus, the general purpose computing device 24 comprises, for example, a central processing unit (CPU), system memory (volatile and/or non-volatile), other non-removable and removable memory (e.g. a hard disk drive, RAM, ROM, EEPROM, CD-ROM, DVD, flash memory, etc.) and a system bus coupling the various components to the central processing unit. The general purpose computing device 24 may also comprise a network connection to access shared or remote devices, one or more networked computing devices, and/or other network devices.

In this embodiment, the general purpose computing device 24 comprises an industrial personal computer (IPC) manufactured by Phoenix Contact of Middletown, Pa., U.S.A., and a programmable logic controller (PLC) in the form of an Allen-Bradley CompactLogix PLC manufactured by Rockwell Automation of Milwaukee, Wis., U.S.A., which is in communication with the IPC. The general purpose computing device 24 is configured to run an automation application for both monitoring and controlling the die pre-heating apparatus 22. The automation application in this embodiment is FactoryTalk® Transaction Manager, supplied by Rockwell Automation of Milwaukee, Wis., U.S.A. The automation application generally serves as an interface between the PLC and a Structured Query Language (SQL) database in which a list of production formulae are stored. The SQL database also stores a list of die numbers, each of which uniquely identifies an extrusion die and a pointer to an associated production formula if one has been assigned to the die number. The SQL database further stores a list of the extrusion dies that are located in the scheduling zone 82 and a list of the die ovens 28 that are available to pre-heat extrusion dies. The automation application also generally serves as an interface between the PLC and an input data/output data SQL database in which process data communicated to and from the die pre-heating apparatus 22, and handled by the PLC, is organized. The general purpose computing device 24 has installed therein the necessary drivers for directing the operation of each of the die ovens 28 and the robotic hoist 38. In this embodiment, the drivers include drivers for operating the motorized components of the robotic hoist 38, namely the trolley 42, the trolley 48, the shaft 52 and the gripping device 56. Shaft 52 is configured to be operated using a closed-loop, flux vector control and a torque proving/brake proving application, which allows for smooth transitions between starting and stopping of the shaft 52.

The general purpose computing device 24 also comprises a display 64 on which a user interface of the automation application is presented. The general purpose computing device 24 further comprises at least one input device, which may be used by an operator to enter information, such as for example a die identity number or data for a thermal program and otherwise to interact with the automation application. In the embodiment shown, the general purpose computing device 24 comprises a keyboard 66 and a mouse 68 for use by the operator.

Figure 8:
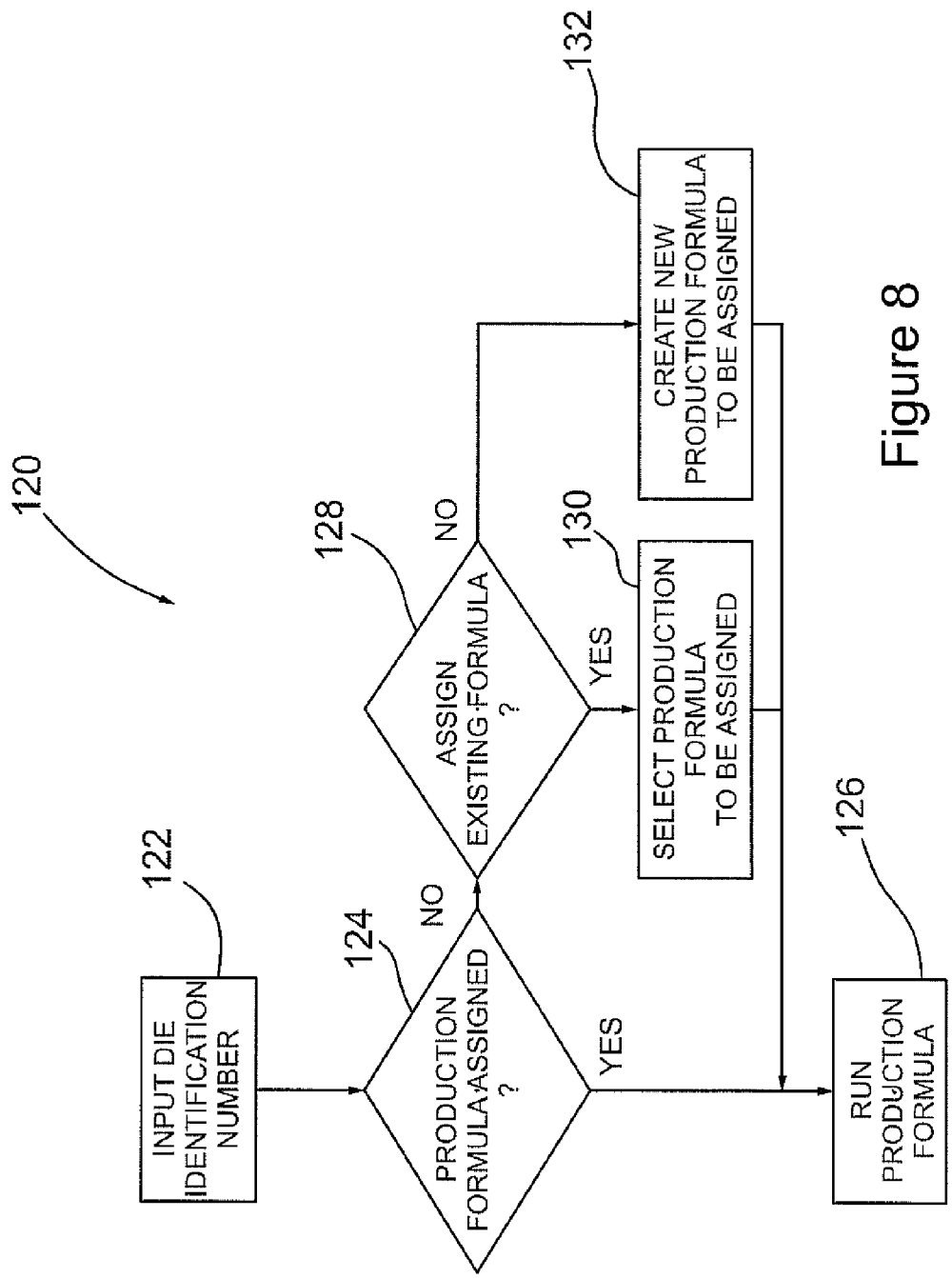
FIG. 8 is a flowchart showing steps of a die information input method used by the die pre-heating system of FIG. 1.

The operation of the extrusion die pre-heating system 20 will now be described with particular reference to FIGS. 8 and 9. FIG. 8 is a flowchart showing steps of a die information input method used by the extrusion die pre-heating system 20, and which is generally indicated by reference numeral 120. During the method, an operator initially brings an extrusion die 30 to the loading and unloading zone 80, and manually loads the extrusion die 30 into an empty die cradle 60 that is supported on the carriage 72 using a suitable tool (not shown), such as a winch or a die hoist. The operator then enters the unique die number identifying the extrusion die 30 into the general purpose computing device 24 using the keyboard 66 or other input device (step 122). In response, the general purpose computing device 24 locates the die number in the die number list that is stored in the SQL database and determines if a production formula has already been assigned to the die number by checking for the existence of a pointer (step 124). If a production formula has already been assigned to the die number, the general purpose computing device 24 uses the pointer to retrieve the production formula from the SQL database and then runs the production formula (step 126). At step 124, if no production formula has been assigned to the die number, the operator is prompted to confirm if an existing production formula from the list is to be assigned to the die number (step 128). If an existing production formula from the list is to be assigned to the die number, then the operator is prompted to select the existing production formula to be assigned to the die number (step 130). Once selected, the die number entry in the list is updated to include a pointer identifying the production formula that has been assigned to the die number. At step 128, if an existing production formula is not to be assigned to the die number, the operator is prompted to create a new production formula to be assigned to the die number (step 132). Once created, the created production formula is added to the production formula list in the SQL database and the die number entry in the list is updated to include a pointer identifying the created production formula that has been assigned to the die number. Following step 130 or step 132, once the production formula has been assigned to the die number, the general purpose computing device 24 runs the assigned production formula (step 126).

During running of the production formula assigned to the extrusion die 30 placed in the die cradle 60, the general purpose computing device 24 directs the motor 74 and associated drive train 76 to bring the carriage 72 to the loading and unloading zone 78. The general purpose computing device 24 then controls the robotic hoist 38 to position the gripping device 56 over the carriage 72. Once in position, the general purpose computing device 24 directs the robotic hoist 38 to lower the shaft 52 and then actuate the gripping device 56 so that the hooks 58 engage the side rails 64 of the die cradle 60.

Once the die cradle 60 has been engaged, the general purpose computing device 24 directs the robotic hoist 38 to raise the shaft 52 thereby to lift the die cradle 60 from the carriage 72, move along the rails 44 to position the die cradle and extrusion die 30 carried thereby above the scheduling zone 82 and then place the die cradle 60 on one of the trays 84 within the scheduling zone 82, as defined in the production formula. The general purpose computing device 24 then awaits input from the operator signifying that the extrusion die 30 is needed for production before pre-heating the extrusion die 30.

Figure 9:
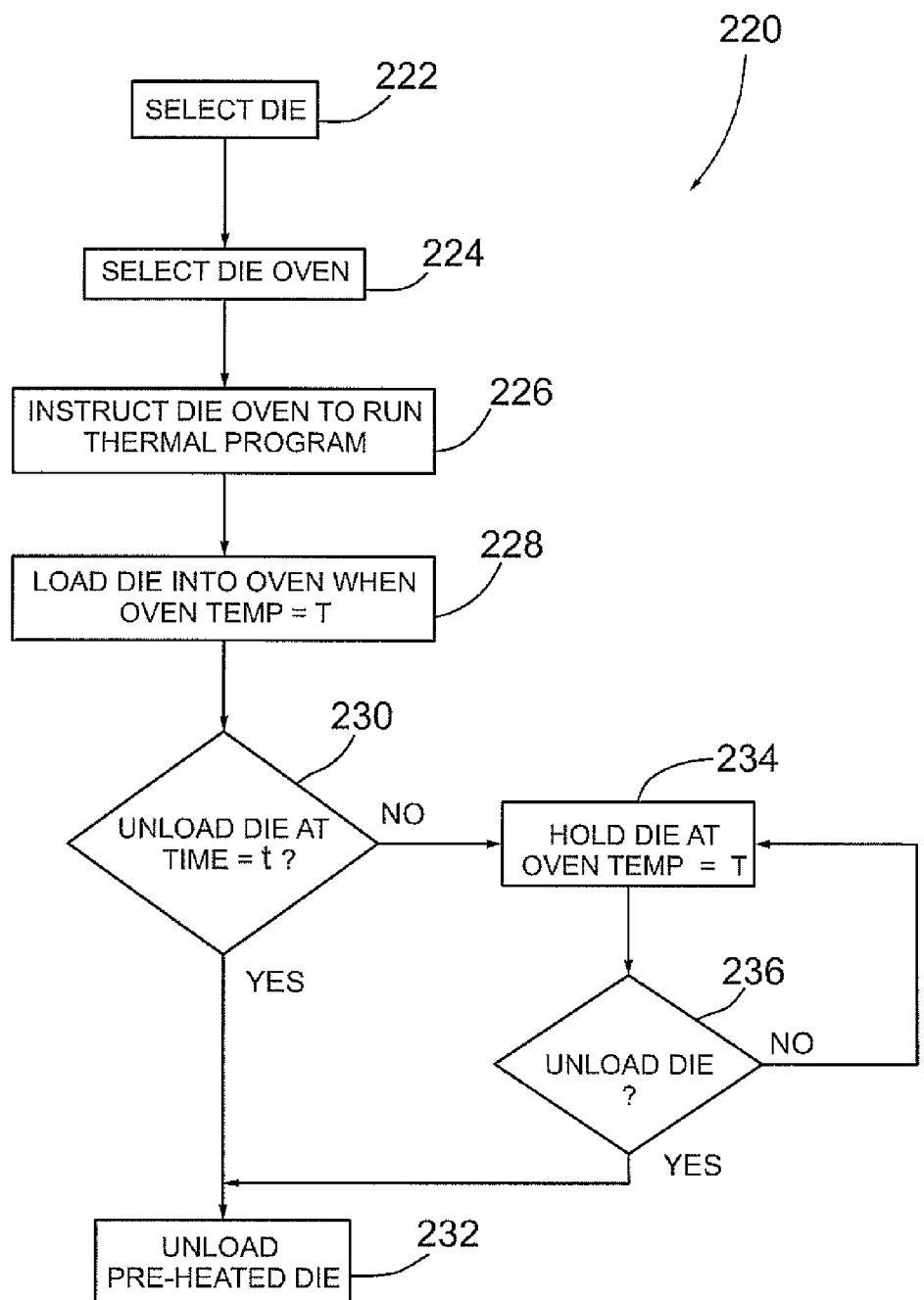
FIG. 9 is a flowchart showing steps of a die pre-heating method used by the die pre-heating system of FIG. 1.

When an extrusion die 30 is needed for production, the die pre-heating system 20 pre-heats the extrusion die 30 using a die pre-heating method, which is shown in FIG. 9 and generally indicated by reference numeral 220. During the die pre-heating method, the operator selects the extrusion die 30 from the list of available extrusion dies resting on trays 84 within the scheduling zone 82 that is presented on display 64 of the general purpose computing device 24 (step 222). The operator then selects a die oven 28 from the list of available die ovens that is presented on the display 64 of the computing device 24 (step 224). With the extrusion die 30 and the die oven 28 selected, the general purpose computing device 24 then instructs the selected die oven 28 to run a thermal program of the production formula that has been assigned to the selected extrusion die (step 226). At this stage, the selected die oven 28 is operated so that it begins to heat. Once the die oven 28 has reached the pre-heating temperature, T, defined in the thermal program, the general purpose computing device 24 operates the hydraulic actuator 36 of the die oven 28 to open the upper lid 34, and directs the robotic hoist 38 to travel to the location of the selected extrusion die 30 in the scheduling zone 82, pick up the die cradle 60 carrying the extrusion die 30, move it to the die oven 28, and load it into the die oven 28 (step 228). Once the die cradle 60 and extrusion die 30 have been loaded into the die oven 28, the general purpose computing device 24 operates the hydraulic actuator 36 to close the upper lid 34.

The extrusion die 30 remains in the die oven 28 at the pre-heating temperature, T for a pre-heating time period, t, defined in the thermal program. At the end of the time period t, the general purpose computing device 24 prompts the operator to determine if the extrusion die is to be unloaded from the die oven 28 (step 230). If the operator selects "yes", then the general purpose computing device 24 operates the hydraulic actuator 36 to open the upper lid 34, and directs the robotic hoist 38 to unload the die cradle 60 carrying the extrusion die 30 from the die oven 28, move it to the die cradle transport mechanism 68 and load it onto the carriage 72 (step 232). The motor 74 and associated drive train 76 are then operated to move the carriage 72 along the rails 70 to the loading and unloading zone 80 thereby to allow the operator to unload the pre-heated extrusion die 30 from the die cradle 60 using a suitable tool (not shown), and transport the pre-heated extrusion die 30 to metal extrusion equipment, for example.

If the operator selects "no" at step 230, then the general purpose computing device 24 pauses the thermal program, and instructs the die oven 28 to remain at the pre-heating temperature T, (step 234) thereby maintaining the extrusion die 30 at this temperature beyond the pre-heating period t defined in the thermal program. During the extended pre-heating period, the general purpose computing device 24 prompts the operator to determine if the extrusion die is to be unloaded from the die oven 28 (step 236). If the operator selects "yes", then the computing device 24 cancels the pause of the thermal program, operates the hydraulic actuator 36 to open the upper lid 34, and directs the robotic hoist 38 to unload the die cradle 60 carrying the extrusion die 30 from the die oven 28, move it to the die cradle transport mechanism 68 and load it onto the carriage 72 (step 232).

If, during the extended pre-heating period, another extrusion die 30 having the same production formula assigned thereto is to be loaded into the die oven 28, the general purpose computing device 24 operates the hydraulic actuator 36 to open the lid 34 of the die oven 28, and directs the robotic hoist 38 to remove the die cradle 60 carrying the extrusion die 30 from the die oven 28 and move and load it into a heated holding oven (not shown) so that the other extrusion die 30 can be loaded into the die oven 28.

As will be appreciated, the die pre-heating system 20 eliminates any need for an operator to manually load extrusion dies 30 into and out of die ovens 28, which advantageously improves efficiency and increases workplace safety. The die pre-heating system 20 also advantageously reduces the possibility of human error related to die pre-heating, and can improve pre-heating uniformity as measured on a die-to-die basis. Additionally, the die pre-heating system 20 allows the die ovens 28 to be arranged in a more compact manner than otherwise would be required for manual loading by an operator, which advantageously allows a smaller amount of floor space to be occupied.

Those skilled in the art will understand that the configurations of the robotic hoist and die cradle transport mechanism are not limited to those described above and that other suitable hoist and die cradle transport mechanisms may be employed.

Although in the embodiment described above, the die information input method and the die pre-heating method are described as separate methods, the die information input method may alternatively form part of the die pre-heating method. In a related embodiment, the general purpose computing device may alternatively not await input from the operator before pre-heating the extrusion die.

Although the die number identifying the extrusion die is described as being input into the general purpose computing device using the keyboard, the die number may alternatively be entered using alternative input devices, such as, for example, a mouse, a barcode scanner, a voice recognizer etc.

Although in the embodiment described above, the operator selects the extrusion die to be pre-heated, the extrusion die to be pre-heated may alternatively be defined in the production formula assigned to the die number of that extrusion die. The die pre-heating method may be started manually by an operator, or may be started automatically according to a starting time specified in the production formula assigned to the die number of the extrusion die.

Also, although in the embodiment described above, the operator selects the die oven to be used, the die oven to be used may alternatively be defined in the production formula.

Although in the embodiment described above, the general purpose computing device prompts the operator if the extrusion die is to be unloaded from the die oven, the extrusion die may alternatively be unloaded from the die oven automatically according to the production formula.

Although embodiments have been described above with reference to the accompanying drawings, those of skill in the art will appreciate that variations and modifications may be made without departing from the scope thereof as defined by the appended claims.

What is claimed is:
1. A die pre-heating system comprising:
   at least one die oven, each die oven comprising a top having an upper lid disposed thereon;
   a robotic hoist; and processing structure in communication with the hoist and said at least one die oven, the processing structure being configured to control the hoist to permit an extrusion die to be loaded into the at least one die oven and to be unloaded from the at least one die oven, the processing structure also being configured to cause the at least one die oven to operate according to a production formula for pre-heating an extrusion die loaded therein, wherein each die oven comprises an actuator in communication with the processing structure, the actuator being responsive to the processing structure to open and close the upper lid to permit the robotic hoist to place an extrusion die into the die oven or to remove an extrusion die from the die oven.

2. The system of claim 1, wherein the at least one die oven comprises a plurality of die ovens.

3. The system of claim 2, wherein said robotic hoist is an overhead robotic hoist responsive to said processing structure and comprising a lifting mechanism positionable over each of said die ovens.

4. The system of claim 3 wherein each extrusion die is supported on a die cradle and wherein said lifting mechanism is configured to engage said die cradle.

5. The system of claim 4 wherein said lifting mechanism is moveable along three generally orthogonal axes.

6. The system of claim 5 wherein said overhead robotic hoist comprises a at least one longitudinally extending first rail, a first trolley moveable along said first rail and supporting a second rail, said second rail being generally orthogonal to said first rail, and a second trolley moveable along said second rail, said lifting mechanism being mounted on said second trolley and moveable generally vertically.

7. The system of claim 6 wherein said first and second trolleys and said lifting mechanism are motor driven.

8. The system of claim 3 further comprising a scheduling zone accommodating die cradles supporting extrusion dies, said robotic hoist being responsive to said processing structure to remove a die cradle from said scheduling zone for delivery to a pre-heated die oven.

9. The system of claim 8 further comprising a die cradle transport mechanism, said robotic hoist being responsive to said processing structure to remove a die cradle carrying a pre-heated extrusion die from a die oven for delivery to said die cradle transport mechanism.

10. The system of claim 9 wherein said die ovens are arranged in spaced groups and wherein said scheduling zone and cradle transport mechanism are positioned between said die oven groups.

11. The system of claim 1 wherein a production formula is assigned to each extrusion die to be pre-heated and wherein said production formula specifies a pre-heat temperature for a selected die oven prior to extrusion die placement therein. die oven.

12. The system of claim 1, wherein the extrusion die is a metal extrusion die.

* * * * *